Oct. 9, 1934.  J. L. SPENCE, JR  1,976,197
AUTOMATICALLY COMPENSATING FILM FEEDING MEANS FOR MOTION PICTURE DEVICES
Filed June 11, 1931   2 Sheets-Sheet 1
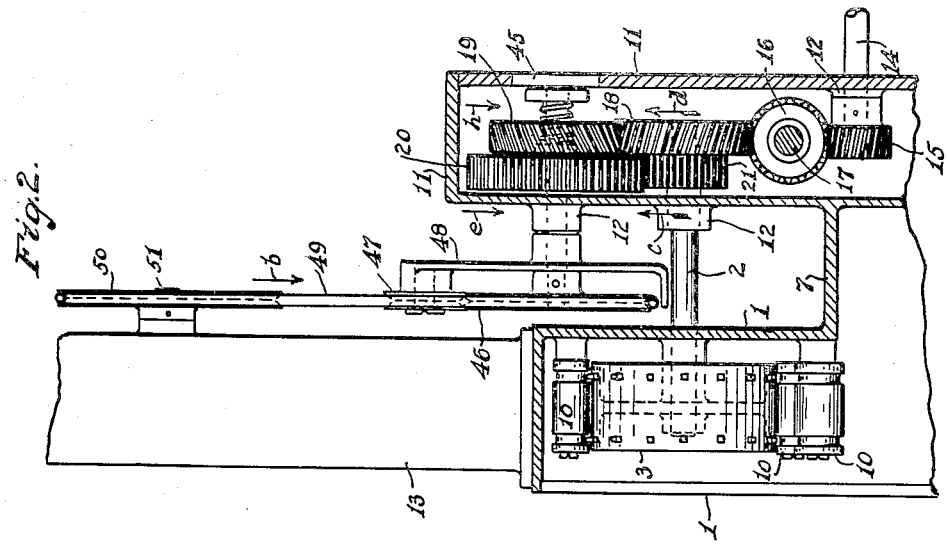
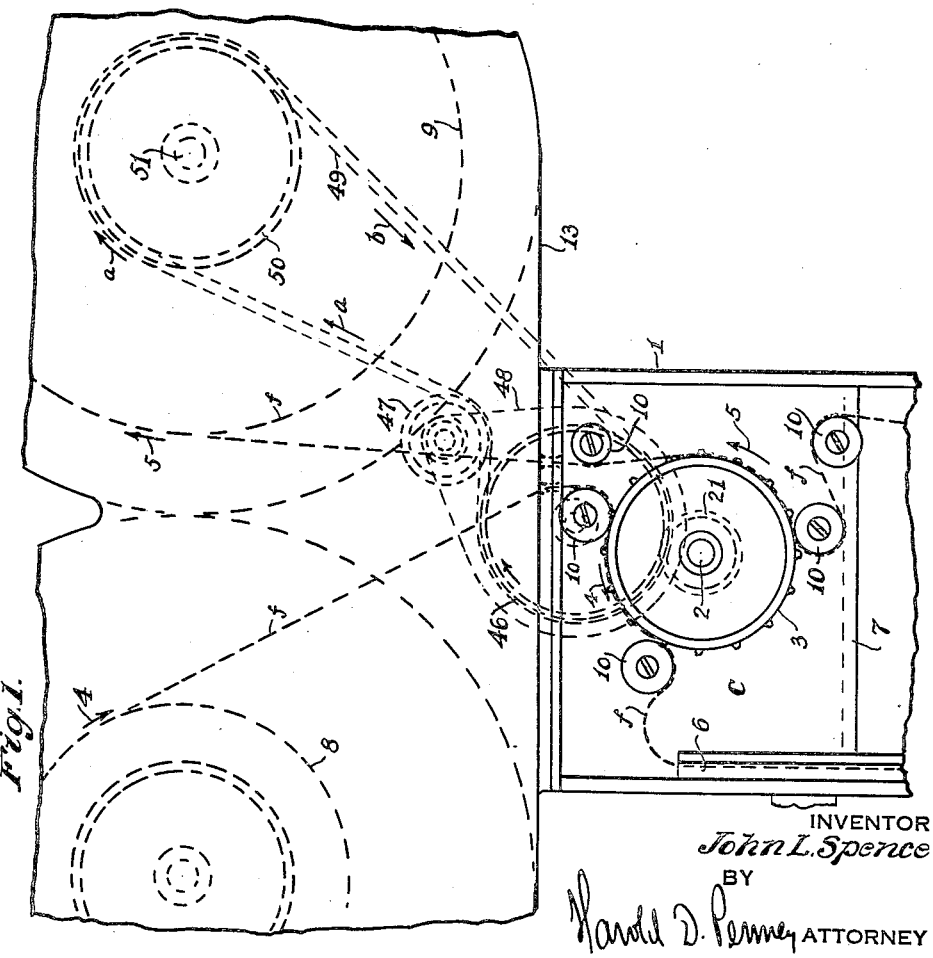
INVENTOR
*John L. Spence Jr.*
BY
*Harold D. Penney* ATTORNEY Oct. 9, 1934.   J. L. SPENCE, JR   1,976,197
AUTOMATICALLY COMPENSATING FILM FEEDING MEANS FOR MOTION PICTURE DEVICES
Filed June 11, 1931   2 Sheets-Sheet 2
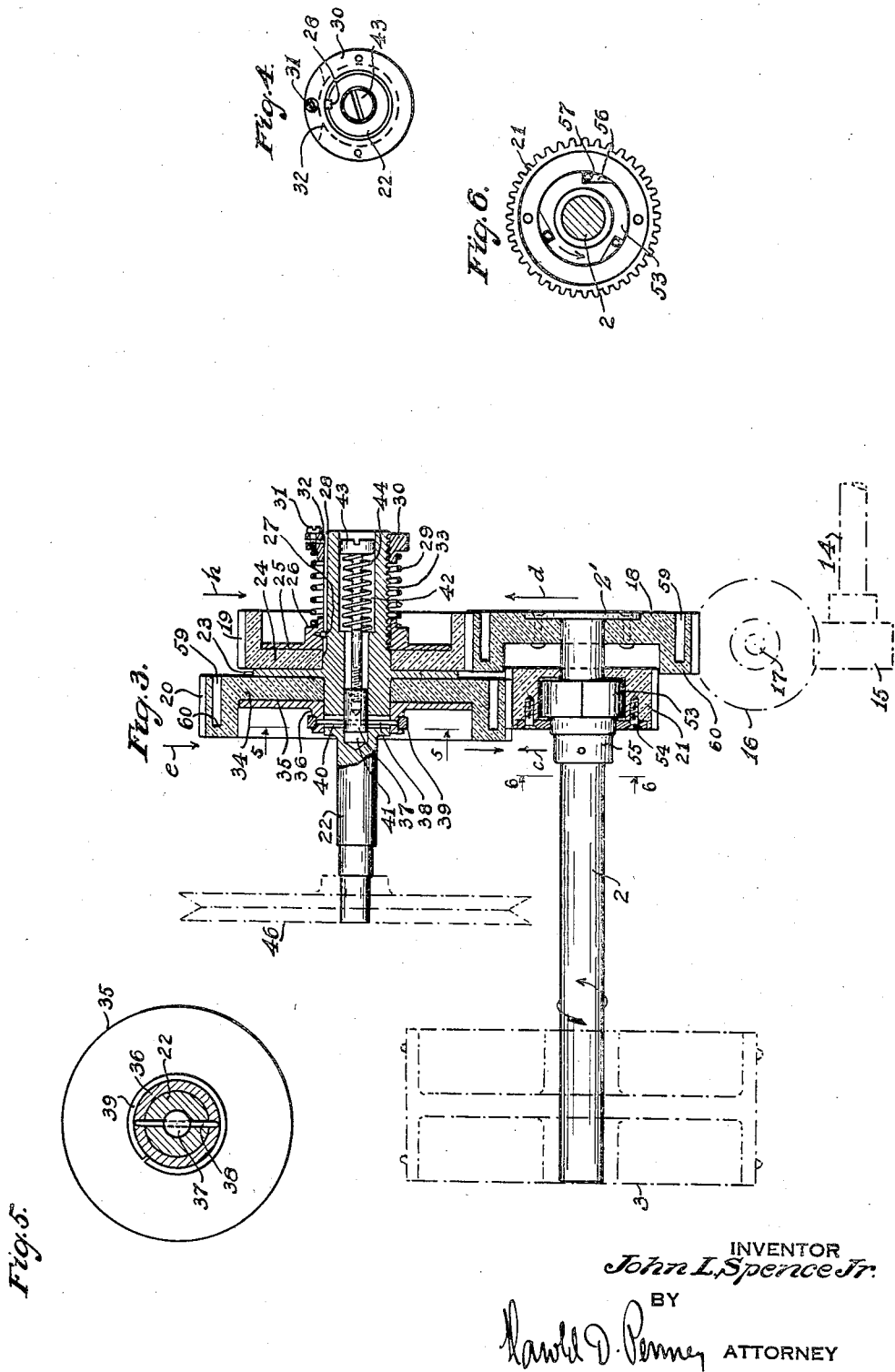
INVENTOR
John L. Spence Jr.
BY
Harold D. Penney ATTORNEY Patented Oct. 9, 1934

1,976,197

UNITED STATES PATENT OFFICE 1,976,197

AUTOMATICALLY COMPENSATING FILM FEEDING MEANS FOR MOTION PICTURE DEVICES

John L. Spence, Jr., New York, N. Y., assignor, by mesne assignments, to Remac Patents Corporation, New York, N. Y., a corporation of New York Application June 11, 1931, Serial No. 543,550

17 Claims. (Cl. 242—55)

My present invention relates to an improved, automatically compensating film-feed gear train for feeding film to and from the film magazines and reels of moving picture camera projectors.

The present structure involves, as its main feature, the utilization of a compounded gear train in which some of the intermeshing individual gear members thereof are rendered compensating for the constantly varying diameters of the film rolls during the running thereof, and as fed to or from one reel to the other during active photographing or projecting, the control thereof being actuated by the increasing diameter of the film upon the take up reel and the resultant slowing of the reel.

The present invention, further, involves the utilization of an adjustable friction means between the compensating members of the gear train, whereby desired film winding tensions may be maintained during the feeding of the film to the take up reel.

A further advantage is in the detailed construction of the gears used herein. This design successfully absorbs vibration and noise frequencies which the standard type of gear generates and transmits, the elimination of noise and vibration being a prime factor in the successful operation of machines used in sound recording or reproduction.

In the present disclosure, only so much of the camera or projection mechanism is shown to indicate the association of the present film feed improvement therewith, such camera or projection mechanism being of standard type and well known to those skilled in the art.

Modifications may be made to the structure herein disclosed, without departing from the spirit hereof nor the scope of the appended claims.

In the drawings,

Fig. 1 is an elevational view, partially fragmented to indicate the relative location of the film drive with a camera or projector mechanism;

Fig. 2 is a side view of Fig. 1, with the lower housing broken away to show gear train and film feeding sprocket of camera;

Fig. 3 is an enlarged sectional view of the gear train structure to better illustrate the structural details and assembly;

Fig. 4 is an end view of secondary friction driven pulley shaft;

Fig. 5 is a sectional view taken on the line 5—5, Fig. 3, looking in the direction of the arrows; and Fig. 6 is a sectional view taken on line 6—6, Fig. 3, looking in the direction of the arrows.

Fig. 1 is developed to aid in understanding the relative location of the associate film feed, gear and camera mechanisms, and these parts are shown fragmentarily. The camera portion generally denoted by C comprises the usual light proof housing 1, one side plate of which is removed to disclose the primary film sprocket driving shaft 2, upon which is mounted the film feeding toothed sprocket 3. The film $f$ is shown as being fed from the reel 8, in the direction of the arrows 4, through the film gate 6, and after passing through the camera means is returned upwardly in the direction of the arrows 5 over the lower face of sprocket 3 to the take-up film reel 9, located in the magazine housing 13.

The usual idlers 10 for controlling the running film in the camera are also indicated.

The housing 1, in the present structure, is provided with a rearwardly extending horizontal wall 7, which in turn merges with and forms a support for a gear train housing 11, which surrounds the said train and is provided with bearings 12 to rotatably support the various shafts of the said gear train mechanism.

The gear train mechanism comprises, as in Fig. 2, a motor driven shaft 14, driven by a suitable power source not shown. This rotatable shaft mounts a rigidly fixed mitre cut gear 15, which in turn meshes with a second mitre cut gear 16 mounted at right angles thereto for rotation on a shaft 17, this latter being rotatably supported in bearings, not shown, but located in the walls of housing 11.

The latter gear 16 in turn meshes with a sprocket drive gear 18, which as is shown in Fig. 3, is riveted to a flange 2', which is integrally, a part of the sprocket drive shaft 2. As will thus be noted, the sprocket 3, shown dotted in Fig. 3, and in full in Fig. 2, is positively driven through the intermediary of the motor driven gear 15, intermediate gear 16 and gear 18.

Gear 19, Fig. 3, is in mesh with and is driven by sprocket drive gear 18. Gear 19 is rotatively mounted upon the secondary friction shaft 22 upon which is developed an integral friction flange 23. The gear 19 is recessed, as in Fig. 3, and has located therein an adjustable, keyed friction flange 25 which bears against the inner wall 24 of the gear 19, and which wall by compression means to be described is frictionally compressed between the flanges 23—25 for variably driving shaft 22.

The hub 26 of the adjustable friction flange 25 is provided with a key 27, which is located in a key slot 28 cut in the body of the shaft 22, so that flange 25 cannot rotate on said shaft, but tends to drive it, when frictioned against the gear wall 24.

To create the desired amount of driving friction between fixed flange 23 and adjustable flange 25 upon the opposite faces of the gear wall 24, the adjacent shaft end is threaded as at 33, and upon this is threadedly engaged a tension adjusting collar 30 between the inner recessed seat of which and the outer recessed seat on hub 26 is located a compressible coil spring 29. The spring adjusting collar 30 is kerfed as at 32, and has a pinch screw 31 across the kerf, so that the adjusting collar 30 may be locked at any adjusted position along the threads 33. Thus any required driving friction between flanges 23 and 25 may be created for varying the shaft driving force of gear 19.

On the opposite side of the fixed flange 23, is a second friction engaged gear 20. This gear is larger than gear 19, and is similarly constructed and being faced about in the opposite direction, substantially locates gears 19 and 20 in a back to back arrangement against opposite faces of the flange 23.

Like gear 19, gear 20 is without positive connection to shaft 22, but is adjustably frictioned, also, by a separate tension and adjusting means. To this end, a friction flange 35, similar to flange 25 is fitted in the recess of gear 20, and presses against the inner wall 34 of gear 20, thus pressing it against the face of flange 23.

In order to create an adjustable tensioning means for this purpose, the body of the enlarged portion of shaft 22 is bored as at 41, and in this bore is mounted a movable cylindrical tensioning block 37. Through this block passes a transverse driving pin 38, Figs. 3 and 5 which in turn passes through an enlarged bore 40 in the shaft 22, to permit of adjusting play of pin 38, and the outer ends of the pin 38 engage the hub 36 of the flange 35. Inasmuch as this driving pin 38 is best fitted somewhat loosely in the hub 36 and the block 37, a split collar 39 is set in a groove about the pin end in hub 36 thereby to retain the pin positively, but to permit its easy removal when required.

The block 37 is threadedly connected to an adjusting screw 43, between the head of which, and the stepped seat in bore 41 rests a compressible coil spring 44, this being an enlargement 42 of said bore.

As shown in Fig. 2 the friction adjustment means of both the gears 19 and 20, are brought to a single point, and to permit accessibility for such adjustment, an opening 45 is provided in the wall of housing 11.

The shaft 22, as in Figs. 2 and 3, carries on its other extreme a belt pulley driver 46, also a belt idler pulley 47 is mounted upon a bracket 48, with means, not shown, for exerting a constant tension upon a belt 49 which connects the drive pulley 46 with the driven pulley 50 connected to shaft 51 of take up film reel 9. In general this form of drive is well known, and, it is thought needs no further detailed description.

The gear 20 meshes in turn with a gear 21 which is loosely mounted upon shaft 2, the gear having a recess in which is mounted a cylindrical clutch member 53 the integral stepped hub 55 of which is affixed to the shaft 2. The member 53 is provided with a plurality of inclined peripheral recesses 56 in each of which is located a clutch roller 57. As thus described, the gear 21 and its inner element 53 comprise a so called "coaster brake" clutch construction, in which relative anti-clockwise movement of the gear to the shaft 2 leaves the gear relatively free, Fig. 6, but the gear is locked to shaft 2 when the gear is held or slowly moved relative to said shaft at any speed of shaft 2, both rotating in the same direction. A cam retaining plate 54 is set in the recessed face of the gear 21 by screws, to retain the gear 21 in operative assembly on the cam.

In detail, the gears 18, 19 and 20, are preferably made of a phenolic condensation compound, while the gear 21 and its roller cam construction may, preferably, be of metal, as is also the shafts and their appurtenant accessories, as described.

While the ratios of the gears may vary to some extent, this being governed by other details, in the present construction, the gears 18 and 19 are of equal ratio to each other, while the gears 20 and 21 are of two to one ratio, gear 20 being larger than gear 21. On the other hand large gear 20 is of a ratio of five to four with gears 18 and 19, whilst gear 21 is of a ratio of five to eight with gears 18—19.

In effect, the directly meshed gear pair 18—19 are a fast or high speed driving pair, and gears 20—21 are a slow speed driving pair.

In action, the present structure operates as follows: presuming that a film has been threaded through the camera or projector C, and the end led up to and attached to reel 9, the motor, not shown, starts the complete mechanism through gears 15—16 to drive fixed sprocket gear 13. This in turn rotates sprocket 3. Comparing the direction of running of the film $f$ in Fig. 1, by the arrows 4 and 5, the belt 49 will run in the direction of the arrows $a$—$b$. Accordingly the gears 18 and 21, Fig. 2, will tend to move in the direction of the arrows $c$—$d$, and the gears 20—21 to run in the opposite direction, as per arrows $e$—$h$.

As the film $f$ is only initially wound a few turns on the drum of reel 9, Fig. 1, the fast running gear set 18—19 are in control of the speed of the pulley 46. Therefore the pulley draws the film upon reel 9 at a starting speed sufficient to wind the film compactly. As this is effected, the gear 20 is driven by the fast speed pair 18—19 and in turn causes gear 21 to revolve at a faster speed than the shaft 2 and its cam clutch 53, but in the same direction. Thus the gear 21 overruns the clutch 53 and causes the rollers 57 to remain at the rear or non-operative position of their angle seats 56 and gear 21 runs relatively at a faster speed, but in the same direction as shaft 2. In other words, the gear 21 will run faster than the shaft 2, and also at the same speed as the shaft in the same direction, but when the gear 21 tends to run slower than the shaft, then the clutch rollers 57 become effective to grip the shaft to prevent such slower gear movement; and this causes the gear train 20, 21 to take some of the strain of drive from the gear train 18, 19.

As the film piles up on the reel 9, the ratio of the overrunning speed of the gear 21 becomes gradually less and less, due to the increasing diameter of the film on the take up reel and the corresponding restraint upon the belt and pulleys, and therefore the gears 20—21 commence to assume control of the pulley drive to reel 9. This action is due, partly to the constraining action of the film $f$ as it leaves the sprocket 3 at a regular controlled speed of delivery, and through the enlarging diameter of the film on reel 9 reacting through the belt and pulleys to slow down shaft 22, till finally the relative speed of gear 21 is slowed up, at which point the gears 20—21 control the speed of the pulley and belt drive through the engagement of the cam clutch rolls 57 with the gear 21. When this occurs, the speed of rotation of the film reel is proportionately controlled to be less as the diameter of the film on reel 9 increases, and the gears 19 and 20, being frictionally held, slip more and more, but always exert enough forward rotative action on reel 9 to keep the film firmly wound, at the controlled running rate of delivery from sprocket 3.

As previously pointed out, this device, adaptable to all types of moving picture devices and recorders, is constructed with regard to quietness in operation of the gear train so that extraneous noises, undesirable in simultaneous sound recording, are eliminated. The same construction to be outlined hereinafter also eliminates a large amount of vibration due to speed of running.

To this end, as in Fig. 3, it will be noted that the alternate gears 18—21 are so constructed as to have a deep, undercut groove or channel 59 cut into one face thereof so that the toothed portion of these gears are connected to the body of the gear blank by a flange 60, thus in effect, while the toothed face of the gears 18—20 are of full gear width, and are connected by the annulus 60 to the main gear body, the teeth of the respective gears are cut out of and are flexibly supported on a relatively thin annulus. Thus, vibrations, due to speed are absorbed at the point of tooth to tooth contact of these gears with their cooperating mate gears 19 and 21, and the characteristic sounds made by gears, running at speed, is enormously reduced. All of the gears of the present train could be so treated, though it has been found that, in ordinary practice, in the present structure, the arrangement disclosed accomplishes the desired ends of the elimination of noise and deadening of the transmission of vibration to adjacent parts of the structure.

It will thus be seen, that the present device eliminates the old practice of slipping the belt on the pulleys to compensate for increasing diameter of the film on the take up reel, and that the present apparatus provides a readily adjustable smooth acting film winding means of sufficient boosting force to overcome temporary sticking of the film or take up reel, and furnishes all the power necessary to drive, at proper winding speeds, large rolls of film.

Having thus described the invention what is claimed is:

1. A film feeding take-up for moving picture mechanisms of the class described, comprising, with a film and a film magazine having feeding and take-up reels therein, of means for positively feeding film through the picture mechanism from the feeding reel to the take-up reel, a plural friction gear train controlled by the tension of the film on the take-up reel and driven by said positive film feeding means, for frictionally driving said take-up reel at a constantly varying speed of rotation and individual means for adjusting the friction of each of said gears in said friction gear train.

2. A film reel drive comprising, in combination with a moving picture mechanism including a film, a film magazine, film feeding and take-up reels with means for positively driving said film through said mechanism, and a clutch gear and friction driven film feeding means including separably controllable gears between said take up reel and said positive film driving means for frictionally driving said take-up reel, said clutch gear and friction driven film feeding means being driven by said positive film driving means.

3. A film reel drive comprising, in combination with a moving picture mechanism including a film, a film magazine, film feeding and take-up reels, with means for positively driving said film through said mechanism and a clutch gear and adjustable friction driven film feeding means between said take up reel and said positive film driving means for frictionally driving said take-up reel, said clutch gear and friction driven film feeding means being driven by said positive film feeding means.

4. A diameter-compensating winding drive for winding material upon a take-up reel, comprising a support, a means located in said support for positively feeding the material to be wound at a fixed feed, means for positively driving said feeding means, fixed gearing between said positive driving means and said feeding means, a friction gear train driven by said fixed gearing to drive said take-up reel, and a clutch gear associated with said fixed gearing and driven by said friction train.

5. A diameter-compensating winding drive for winding material upon a take-up reel, comprising a support, a means located in said support for positively feeding the material to be wound at a fixed feed to said take-up reel, means for positively driving said feeding means, fixed gearing between said positive driving means and said positive feeding means, a friction gear train coupled to said take-up reel and driven by said fixed gearing, and an overrunning clutch gear associated with said fixed and friction gearing and driven by either said friction train or said fixed gearing as the diameter of the material wound upon the take-up reel increases.

6. The combination of a drive shaft having a film feeding sprocket rigid therewith, a film take-up reel, a second shaft operatively connected with said reel, meshing gears mounted on said shafts for rotation therewith, and meshing gears mounted on said shafts and having rotative movement relative thereto.

7. The combination of a film feeding sprocket having a drive shaft rigid therewith, a gear also rigid with said shaft, a film take-up reel, a second shaft having connections with said reel for driving the latter, and relatively movable gears mounted on said shafts and cooperating with the first mentioned gear whereby to revolve the second mentioned shaft at a constantly varying rate of speed as the diameter of said reel increases during winding of a film thereon.

8. In combination, a film drive shaft, a film take-up reel having a pulley thereon, a second shaft having also a pulley, flexible means connecting said pulleys, and gears connecting said shafts and partly movable relative thereto, said gears including a gear rigid with said drive shaft, another gear mounted on said drive shaft and having limited gripping relation therewith, and a pair of gears mounted on the second mentioned shaft and frictionally movable relative thereto, said latter gears being in mesh with the first mentioned gears, whereby to drive the second mentioned shaft at constantly varying rate of speed as the diameter of said take-up reel increases.

9. In combination, a film drive shaft, a film take-up reel, a second shaft, means operatively connecting the second mentioned shaft and said reel, and means for causing the second mentioned shaft to rotate at a varying rate of speed as the diameter of said take-up reel increases; said latter means including a gear which is rigid with said drive shaft, a clutch gear also mounted on said drive shaft, a flange rigid with the second shaft and having annular flat faces, relatively movable gears mounted on the second shaft and having flat faces adjoining the first mentioned faces, said latter gears in mesh with the respective first mentioned gears, and adjustable means carried by the second mentioned shaft and engaging said relatively movable gears whereby to urge their faces into frictional engagement with the faces of said flange.

10. In a film feeding apparatus, in combination with a revolvable shaft, said shaft having therein a terminal axial bore and a transverse bore communicating with the inner end of the first bore, an annular flange extending from said shaft and rigid therewith between the terminal of said shaft and said transverse bore, a pair of gears revolvably mounted on said shaft, each of said gears having a flat inner face, said faces engaging opposite faces of said flange, a pair of collars revolvable with said shaft and axially movable relative thereto, said collars engaging the outer faces of said gears, adjustable means mounted on the periphery of said shaft at said terminal and urging one of said collars inwardly, and adjustable means disposed in said bores and urging the other collar inwardly, whereby to separately control revolution of said gears.

11. A film feeding apparatus including in combination with a drive shaft having a sprocket rigid therewith, and a reel to take up film from the sprocket; said shaft having a gear fixed thereto, and a clutch gear carried thereby; a revolvable shaft; rotary means connecting the last mentioned shaft and said reel; said revolvable shaft having mounted thereon a pair of relatively movable gears which are in mesh with the first gears, and means including resilient means urging said revolvable shaft and its gears into frictional engagement.

12. A film feeding apparatus including in combination with a drive shaft having a sprocket rigid therewith, and a reel to take up film from the sprocket; said shaft having a gear fixed thereto, and a clutch gear carried thereby; a revolvable shaft; rotary means operatively connecting the last mentioned shaft and said reel; an annular flange rigid with said revolvable shaft; a pair of gears relatively revolvably mounted on the second mentioned shaft and meshing with the first mentioned gears, and means yieldably urging said relatively revolvable gears into frictional engagement with said flange.

13. A film feeding apparatus including in combination with a drive shaft having a sprocket rigid therewith, and a reel to take up film from the sprocket; said shaft having a gear fixed thereto, and a clutch gear carried thereby; a revolvable shaft; means operatively connecting the last mentioned shaft and said reel, said means including flexible means; an annular flange rigid with said revolvable shaft; a pair of gears mounted on the second mentioned shaft and revolvable relative thereto, said latter gears being in mesh with the first gears, and means yieldably urging said relatively revolvable gears into frictional engagement with said flange, whereby to slow down the speed of said reel as film accumulates on it.

14. The combination of a film feeding sprocket having a drive shaft rigid therewith, a gear also rigid with said shaft, and a clutch gear mounted thereon; a film take-up reel; a revolvable shaft; means operatively connecting said revolvable shaft and said reel, a pair of relatively revolvable gears mounted on the last mentioned shaft and meshing with the first mentioned gears; means including resilient means urging said revolvable shaft and its gears into frictional engagement, and adjustable means for varying the pressure of said resilient means.

15. The combination of a film feeding sprocket having a drive shaft rigid therewith; a gear also rigid with said shaft, and a clutch gear mounted thereon; a film take-up reel; a revolvable shaft having an annular flange rigid therewith; means operatively connecting said revolvable shaft and said reel, a pair of disk gears relatively revolvably mounted on the last mentioned shaft and meshing with the first mentioned gears; said disk gears having their flat inner faces frictionally engaging said flange; yieldable means mounted on said revolvable shaft and urging said disk gears into the engaged position, said yieldable means including a pair of compression springs, and means for adjusting said springs so as to vary the pressure delivered thereby, whereby a predetermined amount of the drive strain may be taken up by the second mentioned shaft.

16. In a film feeding apparatus, in combination, a drive shaft having a gear fixed thereto, a revolvable shaft disposed parallel with the first shaft and having an annular flange rigid therewith; a clutch gear mounted on the drive shaft, a pair of disk gears freely mounted on said revolvable shaft and meshing with the first gears, said disk gears having their flat inner faces frictionally engaging said flange; yieldable means mounted on the last mentioned shaft and urging said disk gears into the engaged position, said yieldable means including a pair of springs, and means for adjusting said springs, so that a predetermined amount of the drive strain may be taken up by the second mentioned shaft.

17. In a film feeding apparatus, in combination, a drive shaft having a fixed gear and a clutch gear mounted thereon; a hollow shaft having a slot therein, said latter shaft having an annular flange rigid therewith; disk gears loosely mounted on said hollow shaft and having their inner flat faces frictionally engaging said flange, said disk gears being in mesh with the first gears; disks slidably mounted on said hollow shaft and engaging the outer faces of said disk gears; and means urging said disks inwardly, said means having a compression spring mounted on said hollow and engaging one of said disks; another compression spring mounted in the hollow of said shaft, and means passing through said slot and connecting the last mentioned spring and the other disk.

JOHN L. SPENCE, Jr.